United States Patent
Antico et al.

(10) Patent No.: US 6,826,514 B1
(45) Date of Patent: Nov. 30, 2004

(54) MONITORING OF CONTROLLED MOBILE ENVIRONMENTS

(75) Inventors: Chris Antico, Bellevue Hill (AU); Matthew Henderson, C/- 14 Rosslyn Street, Bellevue Hill, New South Wales (AU), 2023; James Neill, West Newport (AU)

(73) Assignee: Matthew Henderson, Haberfield (AU)

( * ) Notice: Subject to any disclaimer, the term of this patent is extended or adjusted under 35 U.S.C. 154(b) by 0 days.

(21) Appl. No.: 09/980,117

(22) PCT Filed: May 17, 2000

(86) PCT No.: PCT/AU00/00467
§ 371 (c)(1),
(2), (4) Date: Nov. 30, 2001

(87) PCT Pub. No.: WO00/70579
PCT Pub. Date: Nov. 23, 2000

(30) Foreign Application Priority Data

May 17, 1999 (AU) .............................................. PQ0411
Sep. 7, 1999 (AU) .............................................. PQ2684

(51) Int. Cl.$^7$ .......................... G06F 17/40; G06F 11/00
(52) U.S. Cl. ..................... 702/188; 702/187; 340/539.1
(58) Field of Search ............................ 702/50–56, 122, 702/127, 130, 133–138, 140, 182–185, 187, 188; 340/870.11, 870.16, 870.17, 501, 428.1, 3.1, 3.3, 3.4; 700/108; 701/29, 35

(56) References Cited

U.S. PATENT DOCUMENTS

| | | | | |
|---|---|---|---|---|
| 4,970,496 A | * | 11/1990 | Kirkpatrick | 340/585 |
| 5,347,274 A | * | 9/1994 | Hassett | 340/988 |
| 5,381,136 A | | 1/1995 | Powers et al. | 340/539.26 |
| 5,686,888 A | * | 11/1997 | Welles et al. | 340/539.13 |
| 5,854,994 A | | 12/1998 | Canada et al. | 702/56 |
| 5,867,801 A | * | 2/1999 | Denny | 701/35 |
| 6,167,827 B1 | * | 1/2001 | Keehan | 114/74 A |
| 6,400,281 B1 | * | 6/2002 | Darby et al. | 340/933 |
| 6,587,767 B2 | * | 7/2003 | Letang et al. | 701/29 |

FOREIGN PATENT DOCUMENTS

| | | | | |
|---|---|---|---|---|
| DE | 19534948 A1 | * | 3/1997 | B65D/79/02 |
| DE | 19832341 A1 | * | 1/2000 | B65D/79/02 |
| JP | 08164895 A | * | 6/1996 | B63J/2/08 |

* cited by examiner

Primary Examiner—Marc S. Hoff
Assistant Examiner—Manuel L Barbee
(74) Attorney, Agent, or Firm—Gary M. Nath; Marvin C. Berkowitz; Lee C. Heiman (57) ABSTRACT

A container 11, carries a component 12 of the telemetry system. The container mounted unit 12 transmits via its antenna 34, a signal 41 containing data indicating the status of the container. This signal is received by shipboard transponder 32 including an antenna 33, a first transceiver 35 for communication with shipboard devices such as the container module 12, control unit 36 which monitors and buffers signals for re-transmission and routes incoming signals, and a second transceiver 37 which transmits and receives signals 39, to and from the satellite 15 via its antenna 38. Thus signals from the container mounted module 12 may be relayed via the shipboard relay 32, the satellite 17 and the communications network 19, 20, 21 to the receiver station 22.

69 Claims, 8 Drawing Sheets

MONITORING OF CONTROLLED MOBILE ENVIRONMENTS

The present invention relates generally to remote sensing and in particular, it provides a system and method of sensing parameters in a controlled mobile environment or other mobile applications over long distances via a satellite communication link.

BACKGROUND OF THE INVENTION

When perishable goods such as fruits, vegetables, fish meat or dairy products are shipped, it is necessary to load them into a controlled environment for the journey. This is particularly the case for delivery over long distances, such as by ship, train or road transport, where goods are transported in shipping containers, as it is necessary to maintain at least the temperature of the goods within acceptable limits over the duration of the journey. In some instances, humidity and various other gas concentrations must also be maintained within specified limits in order to guarantee safe delivery of the goods.

In the past, refrigerated shipping containers were set up with temperature recording apparatus for measuring internal temperature (and also humidity where applicable), at a point external to the container, such that an engineer could periodically monitor the temperature inside each container and act where necessary to maintain the refrigeration equipment to ensure safe passage of the goods. Unfortunately, it has often been observed, at the end of such a journey, that goods in a container have spoiled because the external display has not accurately reflected the internal conditions in the containers. This in turn, leads to expenses for the insurer, the disappointment of the recipient, who does not have the benefit of the product being delivered and often, damage to the business and the reputation of the supplier when the recipient resorts to other, more reliable markets.

SUMMARY OF THE INVENTION

According to a first aspect, the present invention consists in a telemetry system for measuring one or more parameters and transmitting a signal representing the value or values of the one or more measured parameters over a significant distance via at least one communication network the system comprising parameter measurement means to measure the respective parameters, signal generator means to generate a signal representative of the measured value for transmission and local communication means for transmitting the signal via the at least one communication network to a receiving station connected to the communications network and monitoring means also connected to the communications network for receiving the signal and indicating if the value or any one of the values represented by the signal.

According to a second aspect, the invention provides a remote sensing unit for a telemetry system, the remote sensing unit comprising:

parameter measurement means to measure a parameter or parameters of interest;

signal generator means to generate a signal representative of the measured value of the or each parameter; and communication means for transmitting the signal to a transceiver, located on the ship or vehicle when the ship or vehicle is in transit for further transmission via a communication network.

According to a third aspect, the invention provides a control unit arranged to be connectable to a data logging device and including trigger signal generating means to trigger the data logger to download data, data input means to receive data from a connected data logger, signal generating means to generate a signal encoding the downloaded data in a format suitable for transmission over a communications network and input/output means arranged for connection to a communications device for communicating the signal generated by the signal generating means to the communication device.

The transceiver may be a transponder, arranged only to transmit on an interrogation from the satellite, or may be a transceiver arranged to initiate communication with a satellite mounted transponder.

The transceiver may also be an interface to a land based telecommunications network such as a public switched telephone network.

The system of the present invention is particularly useful for monitoring conditions within a standard shipping container of the type typically used in sea transportation, however, it is equally applicable for use in other types of containers and in fact, in fixed shipboard or vehicle mounted locations such as an equipment space where bilge pumping equipment might be located. By enabling communication with any network to which a suitable interface is provided, a container may be monitored while on land vehicles, in storage awaiting trans-shipment and on sea-going vessels.

In one particular embodiment, a plurality of containers are fitted with monitoring systems and each transmits information as required, to others of the containers similarly fitted with monitoring devices. One of the containers is then fitted with a master transceiver for receiving signals from the monitoring systems of other containers such that the master transceiver may collect and transmit all of the signals from all of the other monitoring systems to the satellite, either directly or via an intermediate transceiver or transponder mounted elsewhere in the ship or other vehicle.

In a further variation, the monitoring systems, or at least some of the monitoring systems located in the containers are interconnected to one another by wire connections. Similarly, the master transceiver and possibly also the main transceiver for satellite communication may also connect to the other monitoring systems by cable, such that the only reliance on wireless communication is between the satellite and the main transceiver, and between the satellite and the earth station.

In an extended embodiment of the invention, the monitoring functions of the remote sensing unit may include, as well as inputs for monitoring temperature and humidity, inputs for monitoring air flow, air pressure (or partial pressure of components), location (via GPS), shock, voltage, current (power supply conditions of environmental control equipment or other equipment supporting or forming part of the consignment), shaft speed (RPM), water purity, filtration operation, illumination levels, pollution levels (eg; engine emissions), security breaches (opening of doors/windows or interruption of security beams or other security devices), surveillance camera operation or motion detection.

As well as the monitoring of perishable food items such as produce, dairy, seafood, meat, wine and flowers etc, other applications for embodiments of the present invention, include the monitoring of hazardous cargoes such as, oil, other flammable or toxic goods, cotton, coal etc, environmental hazards or equipment for minimising hazards, such as, pollution controls, machinery discharge, sewage outflows, discharge of ships' ballast, monitoring of pollution factors such as noise, air quality, water quality or the monitoring of security such as by monitoring position (eg; GPS), surveillance cameras, locking and unlocking of controlled spaces, entry and exit of controlled spaces, or any other compatible monitoring or security functions.

Therefore, for example, a ship could be monitored for opening of its ballast valves and the location reported back to a central site. This process might also monitor the duration and volume of the dump.

It would also be possible to monitor complex sets of environmental parameters such as ethylene concentration, oxygen and humidity in the atmosphere inside a container as well as temperature and to use these parameters to predict a projected state of a perishable cargo, such as fruit at the end of a journey, from a history of the conditions to which the cargo has been subjected up to the current point in the journey.

In a first embodiment, the measurement of the one or more parameter values is performed by a stand alone data logging device which includes measurement means for measuring the parameter values, which might typically be temperature and humidity, storage means such as a digital memory or a magnetic storage device such as a floppy disk drive to record the measured parameter values and control means to periodically cause the measurement to be made and recorded in the storage means. The control means also preferably includes an input/output means for receiving a trigger signal to trigger the down loading of data and in response to the trigger signal, generating an output signal representing some or all of the data held in the storage means. Preferably, the control means records the parameter values at regular intervals for example, in the range of once per 10 minutes to once per 2 hours.

In the first embodiment, a control unit is connected to the data logger and to the transmission means and for transmission via the at least one transceiver. The control unit can either be arranged to periodically download the data from the data logger and initiate a transmission automatically, or alternatively, the control unit may be arranged to respond to a signal transmitted to the communication means from the monitoring means via the at least one transceiver to then unload data from the data logger and transmit it to the receiving station. In the case where the control unit periodically initiates downloading of data for transmission without prompting from the monitoring means, the control unit may also examine the data and if it is in tolerance, it may merely send a transmission indicating that the system is operating correctly and all data is in tolerance rather than sending all of the recorded data.

Preferably, the communication means is a transmitter arranged to transmit to a local transceiver which in turn relays the signal to the receiving station via pre-existing communications channels. In the case of shipboard operation, the pre-existing communications system may include a communications channel associated with a satellite navigation system, which in turn communicates with a private or public switched network. The communication means in this case, a low power transmitter which communicates with a shipboard transceiver, which in turn signals via a satellite to a ground station where interconnection with the switched network occurs.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENTS

Figure 1:
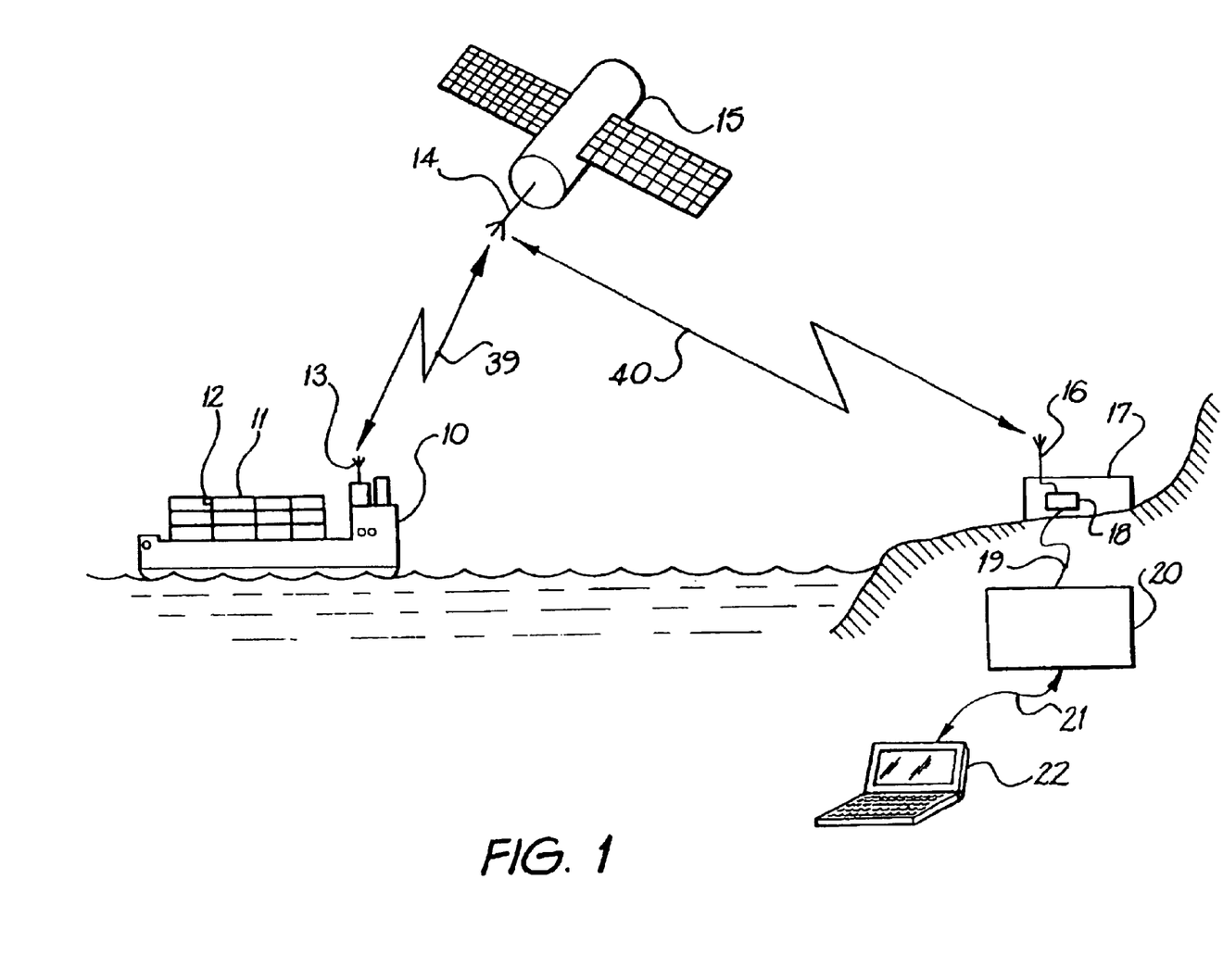
FIG. 1 provides a schematic overview of a communication system embodying the present invention.

Referring to FIG. 1, an overview of the preferred embodiment is provided, wherein the telemetry system of the present invention is associated with one or more containers 11 loaded onto a ship 10 which has a communication system associated with its satellite navigation system. The communication system transmits signals 39 from an antenna 13 on the ship 10 to an antenna 14 on a communication satellite 15 in orbit above the earth. The geographical location of the container is also determined by using a system of at least 3 satellites at any one time and these are part of a network of satellites providing global coverage, however, for simplicity, these are not shown. The communication satellite then retransmits the signal either directly or indirectly to an antenna 16 of a ground station 17 where the transceiver 18 is directly or indirectly connected to a communication network 19, 20, 21, which may be a private network, a public switched network, a combination of the two, and may include a component in which data is transmitted via the internet. Alternatively, the data may be inserted into a web page at the ground station 17 and all handling of the data from that point may be via the internet. Also connected to the communications network, is a monitoring station 22 which may be a single personal computer, or may itself be a network of computers monitoring a large number of containers simultaneously.

Figure 2:
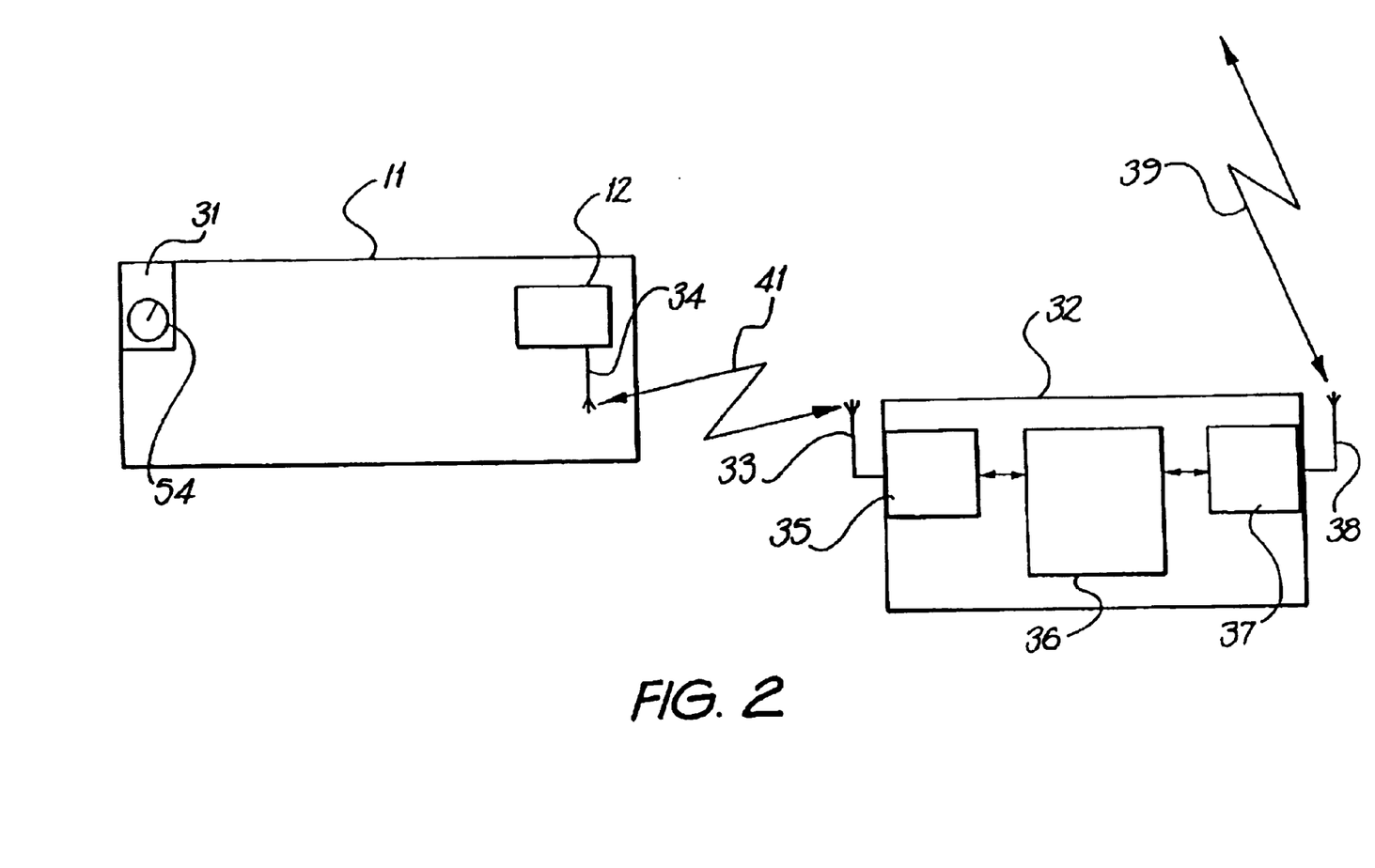
FIG. 2 is a schematic diagram of the shipboard components of a shipping container monitoring embodiment of the invention.

Turning to FIG. 2, a container 11, carrying a component 12 of the telemetry system is illustrated. The container is a refrigerated container in which the refrigeration unit 31 is preset to a value which it will automatically maintain throughout the journey. The refrigeration unit monitors the internal temperature of the container 11 and records it on the pie chart recorder 54 such that if the refrigeration unit 31 malfunctions and fails to maintain the correct temperature, an engineer monitoring the container on the ship, will notice the error and take the necessary corrective action. Unfortunately, sometimes the refrigeration and/or monitoring unit will malfunction in a manner which causes the recorder to continue indicating a correct internal temperature, even though the temperature is out of specification.

It has been known in the recent past, for shippers to place their own data logger in a container so that they have a record of temperatures at the end of the journey which give an indication of whether the temperature went out of specification during a trip and whether this is an explanation for spoilage of part or all of the contents of the container prior to arrival at the destination.

However, such data loggers did not correct the situation, they simply provided evidence as to what went wrong.

In the proposed telemetry system, the container mounted unit 12 transmits via its antenna 34, a signal 41 containing data indicating the status of the container. This signal is received by shipboard transponder 32 including an antenna 33, a first transceiver 35 for communication with shipboard devices such as the container module 12, control unit 36 which monitors and buffers signals for re-transmission and routes incoming signals, and a second transceiver 37 which transmits and receives signals 39, to and from the satellite 15 via its antenna 38. Thus signals from the container mounted module 12 may be relayed via the shipboard relay 32, the satellite 17 and the communications network 19, 20, 21 to the receiver station 22.

Figure 3:
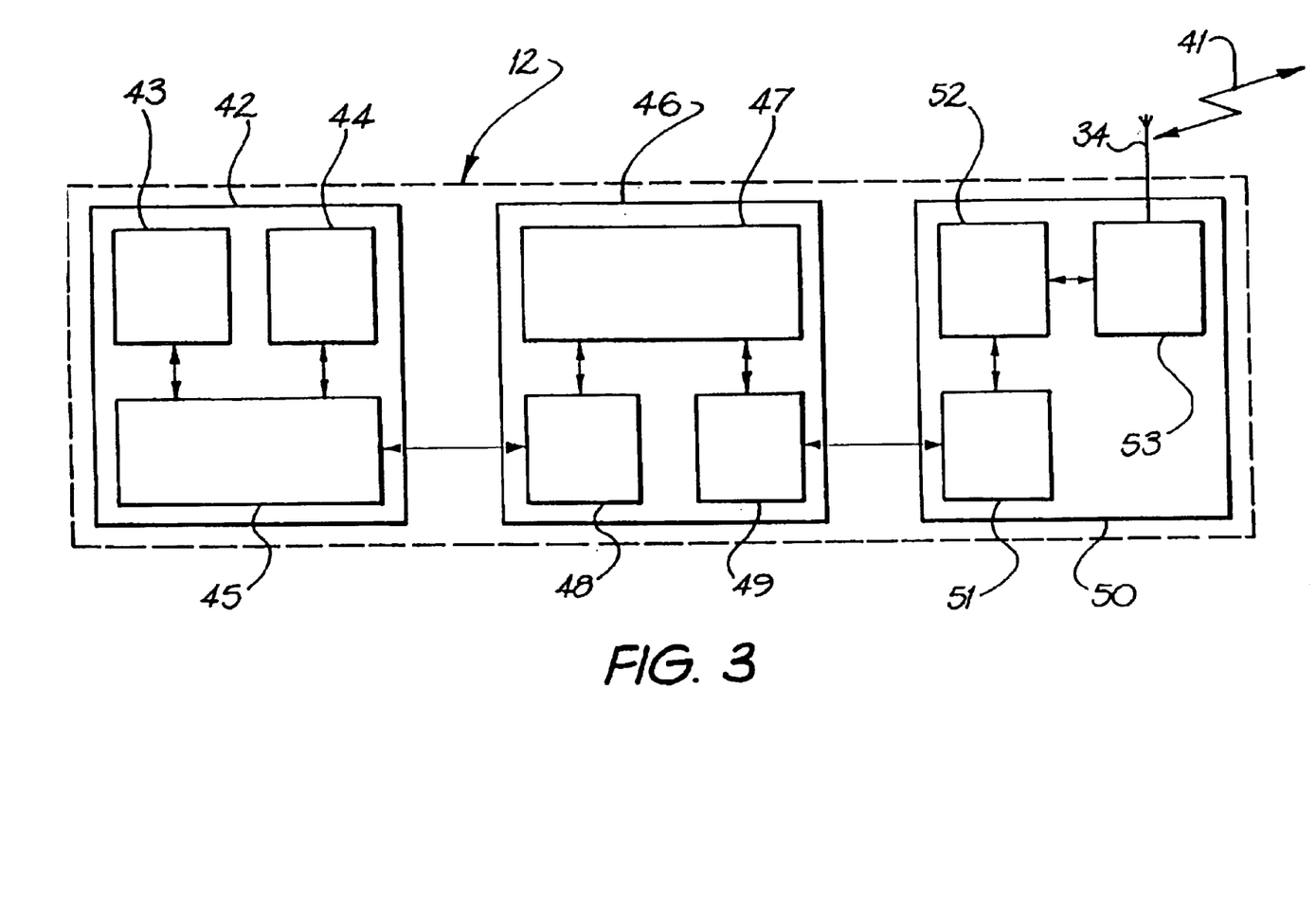
FIG. 3 is a more detailed block schematic of the container mounted components of one embodiment of the general system illustrated in FIG. 2.

In a first embodiment of the present invention shown in FIG. 3, a prior art data logger 42 is incorporated into the proposed telemetry system. These units are known and understood to provide reliable measurement of the environmental parameters within a container and are therefore trusted by the shippers.

The data logger 42 will typically contain one or more parameter sensors 43, such as temperature and relative humidity sensors, a memory 44 for storing parameter measurements until they are required in response to an interrogating signal and a control circuit 45 which would typically be a microprocessor programmed to periodically interrogate the sensor or sensors and to record the measured parameter values and to respond to an external interrogating signal to transmit data to an interrogating device.

A control unit 46 is connected to the data logger 42, and is preferably an appropriately preprogrammed microprocessor 47 having a first input/output interface 48 for connection to the data logger 42 and a second input/output interface 49 for connection to a communication device 50. The control unit 46 periodically interrogates the data logger 42 by initiating an interrogation trigger signal via the input/output device 48 and accepting the data transmitted by the data logger 42. Triggering of the downloading of data may be in response to a signal received from the monitoring station 22, or alternatively, may be initiated by preprogramming in the control unit microprocessor 47, which causes the download to be triggered at regular intervals.

When data is downloaded from the data logger 42, it would typically be transmitted on to the monitoring station 22. However, it is possible in some embodiments for the control unit 46 to examine the downloaded data and only transmit the data if the data is out of specification or if the period since the last transmission to the monitoring station 22 is greater than some predetermined period. It is also possible for the control unit 46 to only transmit a status signal indicating that the parameters are within specification or outside specification, rather than sending all of the data. Some of these options depend on whether the data logger used, deletes its data when it downloads and whether it is desirable to include memory in the control unit 46 to buffer and retain downloaded data.

When the control unit 46 is required to transmit data or a status to the monitoring station 22, it generates an output via the second input/output device 49 which interfaces with a standard transceiver 50, provided by the company providing the satellite communication-service via the satellite 15. The transceiver 50 includes an input/output circuit 51, a control unit 52 and an rf modulator/demodulator circuit 53 to interface the antenna 34. The transceiver unit 50 transmits signals to and receives signals from the ship's central transceiver relay 32 via which signals can be communicated to and from the ground based monitoring station 22.

Figure 4:
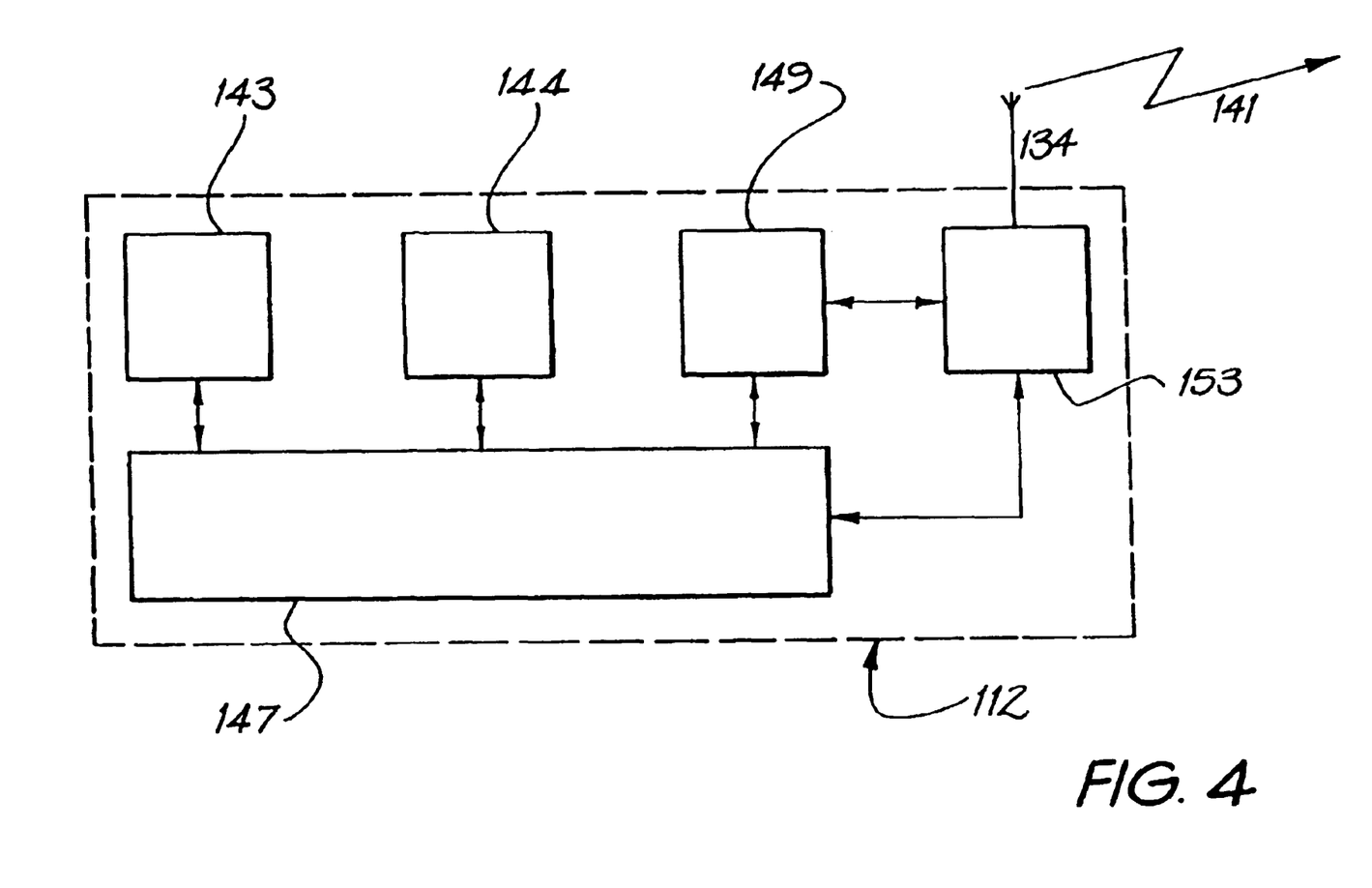
FIG. 4 is a block diagram of an integrated module performing the same functions as the FIG. 3 embodiment.

Referring to FIG. 4, this provides an alternative to the arrangement of FIG. 3, wherein the functions of the data logger 42 control unit 46 and transceiver 50 are integrated into one unit, the integrated container module 112. The integrated container module circuit 143 interfaces with a control circuit 147, preferably implemented as a microprocessor. A buffer memory 144 is connected to the control circuit 147, to hold the parameter data at least between transmissions to the monitoring station 22 and possibly for the whole journey. An input/output device 149, is provided to generate output data signals formatted for transmission over the communications network and the formatted data signals are transmitted via a modulator/demodulator 153 and antenna 134 to the ship's relay transceiver as with the FIG. 3 arrangement.

The system described above envisages that if multiple containers 11 on a ship or other transport vehicle are fitted with monitoring devices 12 they would all communicate back to the transmitter/receiver 32 independently of one another. However, on a large ship for example, a container 'buried' at the bottom of a forward hold will have a large amount of metal between it and a transmitter/receiver located in a 'habitated' area of the ship, such as the bridge 101, or an associated instrument room. Additionally, there is no predictability as to what cargo may also block or interfere with the signal from a monitoring device 12 to the transmitter/receiver 32.

Figure 5:
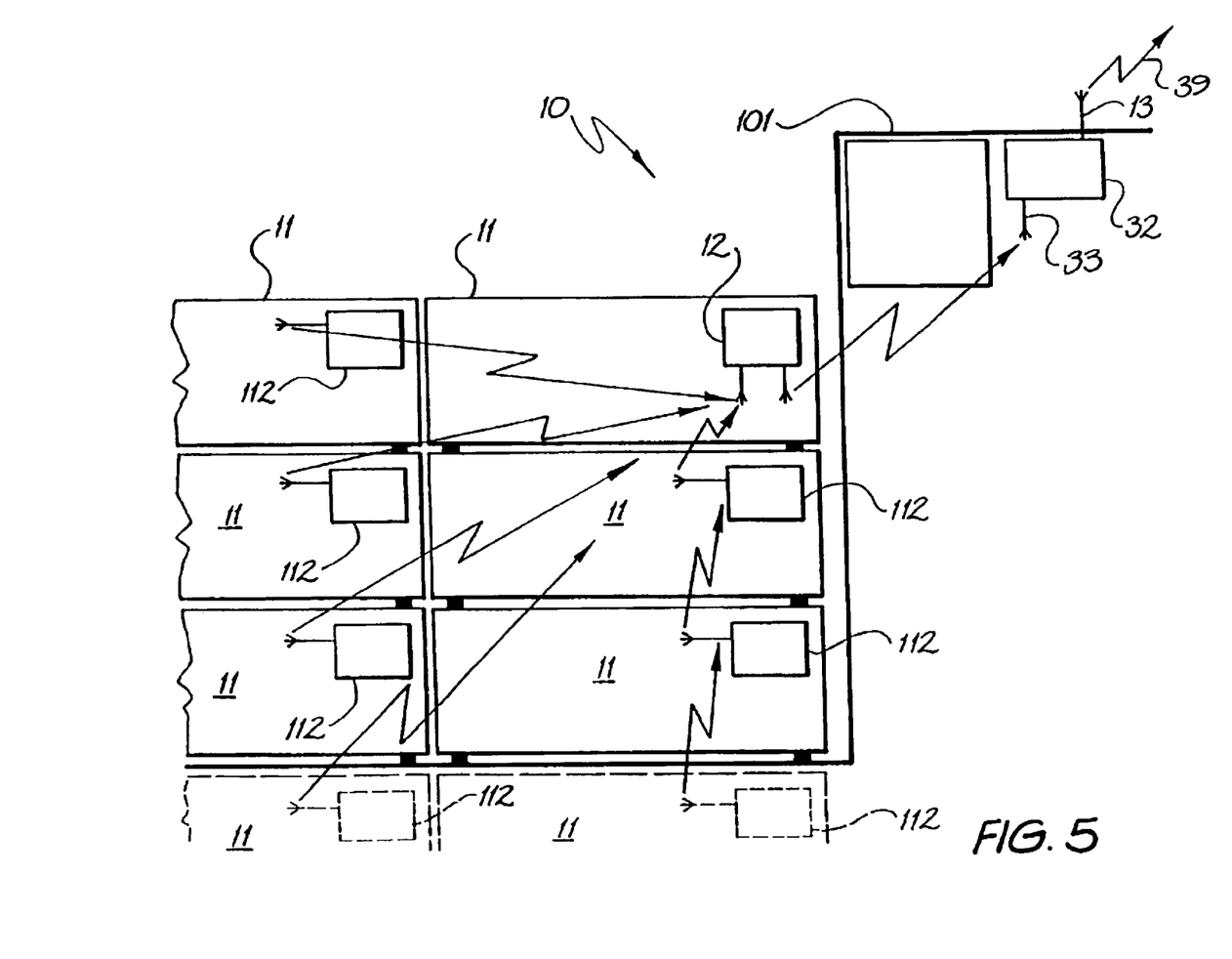
FIG. 5 is a schematic representation of a number of shipping containers loaded on a ship, showing a first method of communicating between individual container monitoring units and an orbiting satellite.

Therefore, turning to FIG. 5, an alternative arrangement for communicating between the monitoring device 12 and the transmitter/receiver 32 is illustrated, in which a container 11 having a monitoring device 12 capable of communicating with the transmitter/receiver 32, serves to relay signals between a group of other monitoring devices 112 in containers in the vicinity of the monitoring device 12 and the transmitter/receiver 32. The container in which the monitoring device 12 of FIG. 5 is located is selected to be the top container in a stack such that it has a relatively uninterrupted transmission path to the transmitter/receiver 32. To simplify the loading arrangement of containers 11, it is preferable that every monitoring device 112 is capable of communicating with the transmitter/receiver 32 and capable of relaying signals to and from the transmitter/receiver 32 and monitoring devices 112 in other containers 11 in the vicinity. In such arrangements, the system of the present invention may determine a signal strength of each monitoring device 112 and instruct one or more monitoring devices 112 having a strong signal strength, to relay signals to and from monitoring devices 112 having a weak signal strength. Such an arrangement permits a random loading of the containers 11, and does not impose limitations on the location of one or more containers, which can unduly complicate loading.

A number of relay monitors 12 may be provided along the length of a ship, to service all of the monitors 112, from bow to stern.

The relay transceiver/receiver 32, 232, can be mounted in any type of vehicle such as a semitrailer or railcar and can also be mounted in a container storage yard in which case, it need not use satellite communications and can be connected into a cable based telecommunication system, although satellite or cellular phone technology could still be used in container yards if required, for example, in a country where the cable based infrastructure is underdeveloped or unreliable.

Figure 6:
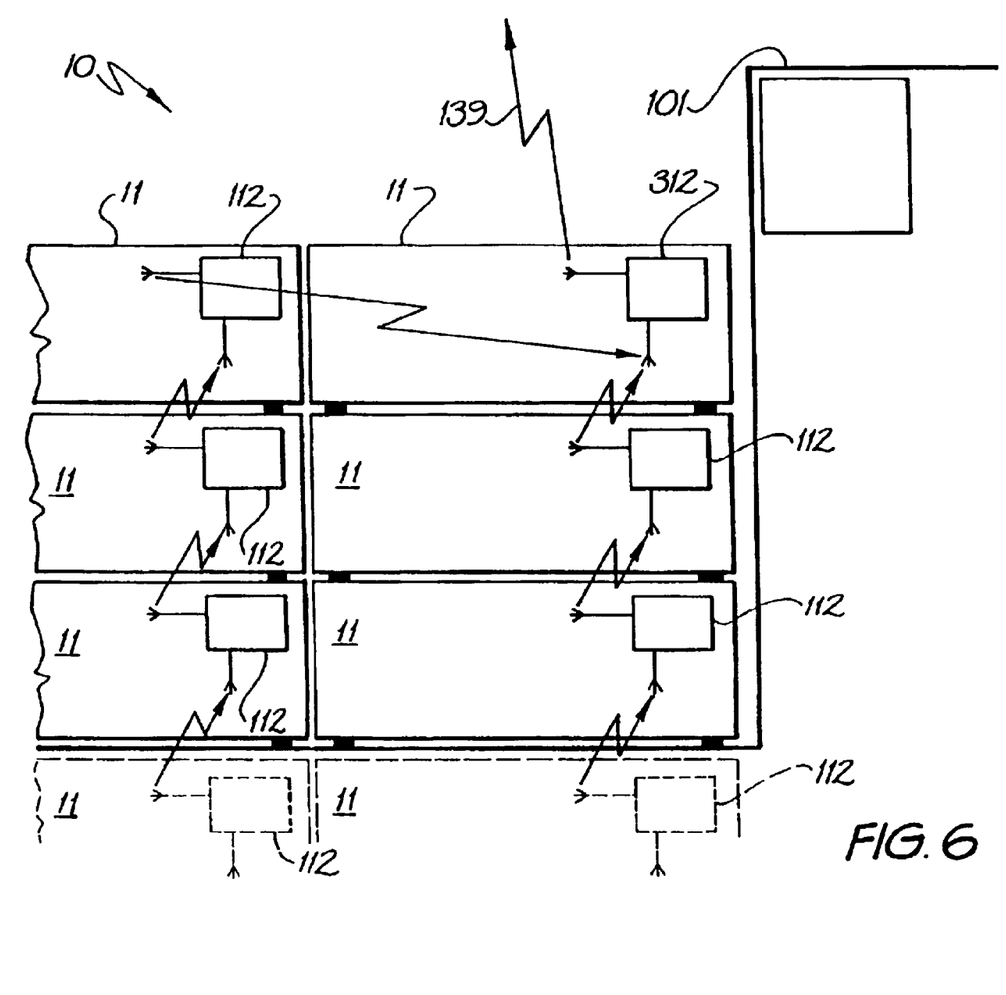
FIG. 6 is a schematic representation similar to FIG. 5, showing a second method of communicating between individual container monitoring units and an orbiting satellite.

Referring to FIG. 6, a further alternative arrangement is illustrated, in which the monitors 112 each communicate with a similar monitor 112 in a container immediately above, and the monitors in containers at the top of stacks of containers, communicate with monitors in the next horizontally adjacent monitor to pass a signal towards a master monitor 312 which then transmits the signal 139 to the satellite communication system.

Figure 7:
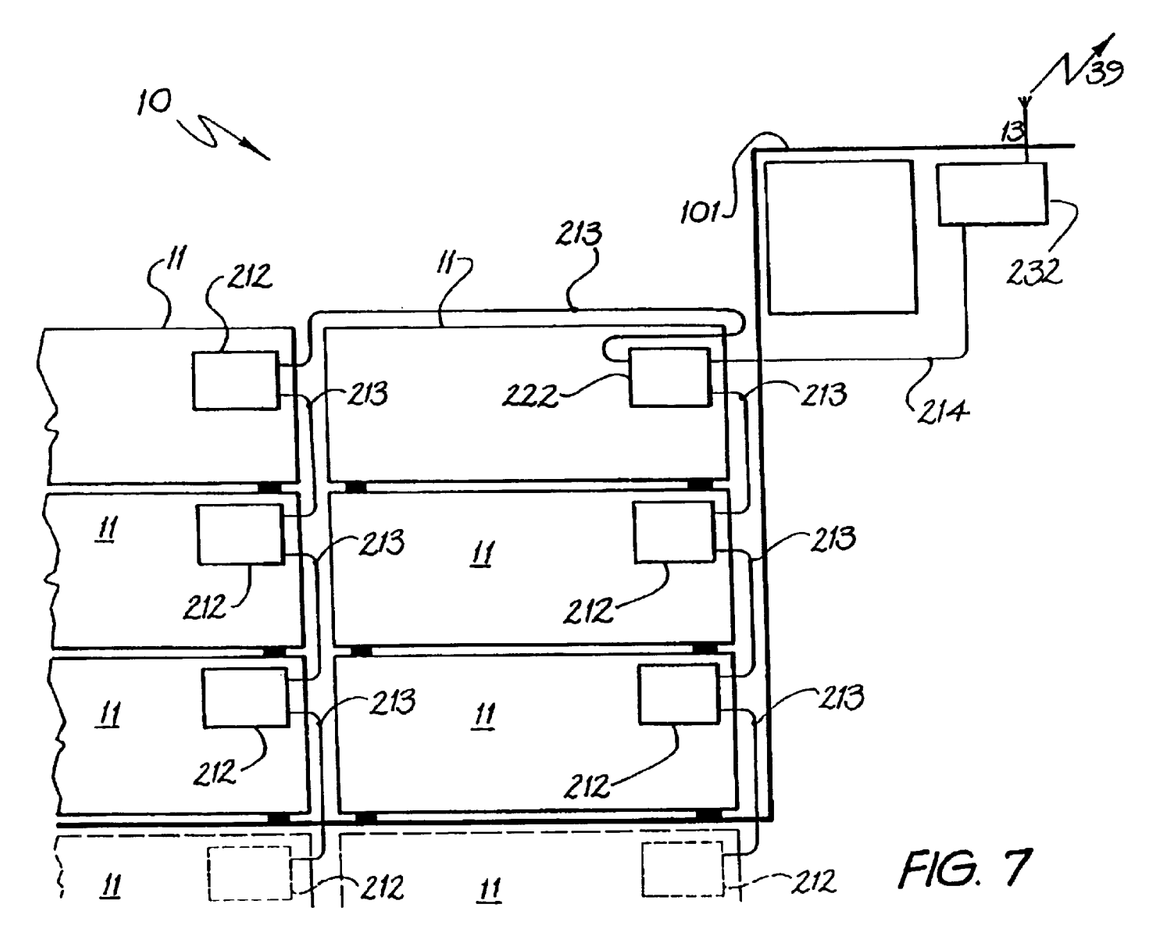
FIG. 7 is a schematic representation similar to FIG. 5, showing a third method of communicating between individual container monitoring units and an orbiting satellite.

Another arrangement for communicating between individual monitors 212 and the transmitter/receiver 232 as illustrated in FIG. 7. In this embodiment, the monitors 212 are wired together in a daisy chain system by interconnecting cables 213, such that signals are passed from monitor to monitor, up stacks of containers and along the top row of containers until the signals reach a master monitor 222 in a container nearest the transmitter/receiver. The master monitor unit 222, is then connected to the transmitter/receiver 232 by a cable 214 to complete the communication network of the ship 10 or other vehicle. Note it will be necessary in some instances to link several monitors 212 to one other monitor 212 at the top of stacks where connections are received both from a monitor 212 in the container below and from a monitor 212 in a container on the same row, but further forward in the ship 10.

Figure 8:
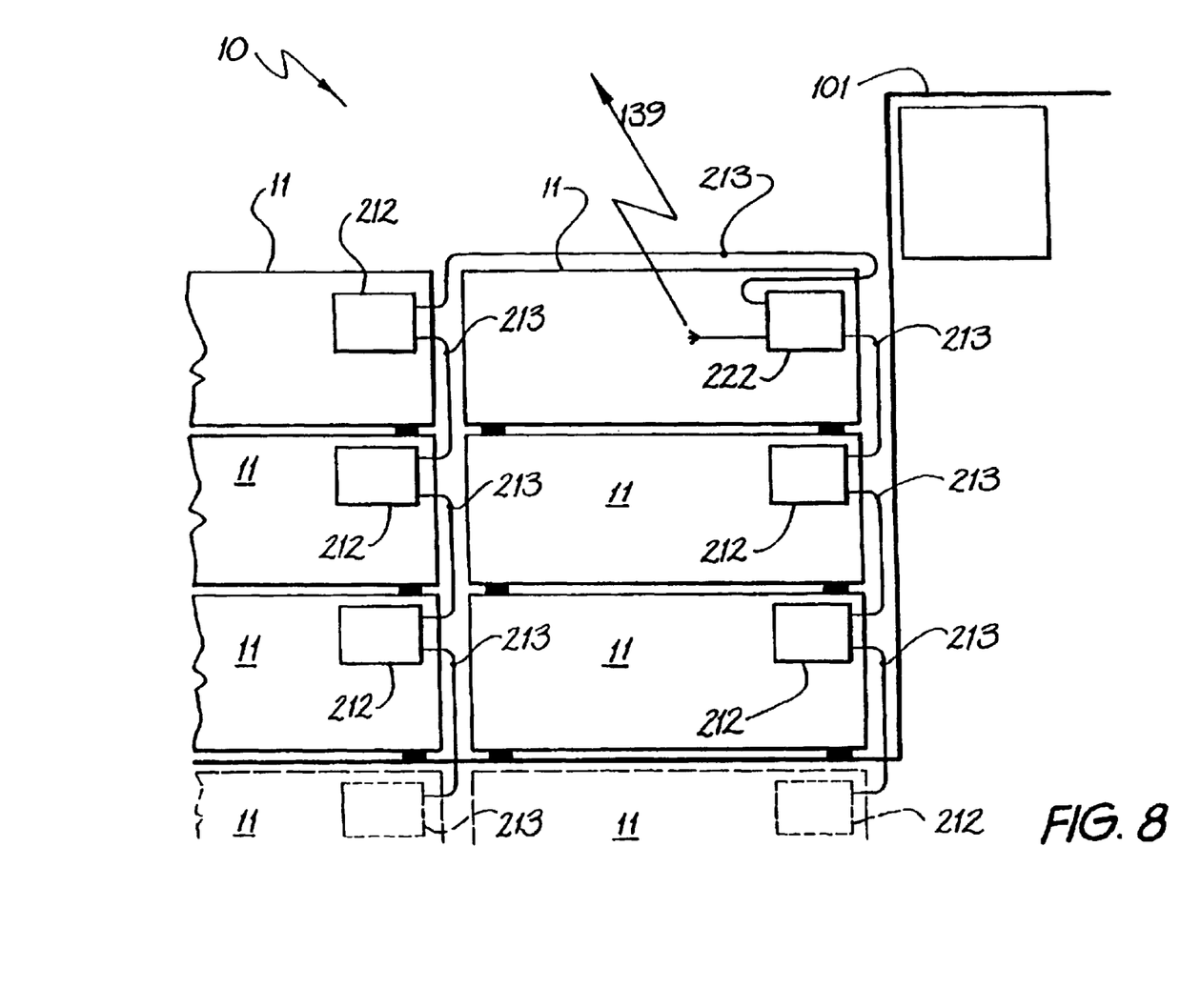
FIG. 8 is a schematic representation similar to FIG. 5, showing a fourth method of communicating between individual container monitoring units and an orbiting satellite.

The arrangement of FIG. 8 is similar to that of FIG. 7, except that the master monitor unit 222 also acts as the transmitter/receiver unit as was the case with the master monitor unit 312 in FIG. 6.

It will be recognised that features of the various arrangements described above can also be mixed in other combinations as required by the particular circumstances of a case, in order to achieve the best result for those circumstances.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A telemetry system for measuring one or more parameters within a transport container and transmitting a signal indicating the value or values of the one or more measured parameters, or the status of the respective transport container, over a significant distance via at least one communications network, the system comprising:
    a) a receiving station connected to the communications network;
    b) monitoring means for receiving the signal and indicating the value or any one of the values represented by the signal, or the transport container status; and
    c) a mobile monitoring sub-system mounted on or within the transport container comprising:
        i) parameter measurement means to measure the respective parameters;
        ii) signal generating means to generate a signal for transmission indicating the value or values of the one or more measured parameters, or a status of the transport container, wherein the signal generating means holds data tolerance information in relation to the respective transport container and, when the signal generated by the signal generating means is to be transmitted, the signal generating means examines the value or values of the one or more measured parameters and if they are in tolerance, generates a status signal indicating that the system is operating correctly and all parameters are in tolerance and if they are not in tolerance, the signal generating means generates the signal representing the value or values of the one or more measured parameters; and
        iii) local communication means for transmitting the signal via the at least one communications network to the receiving station and the monitoring means.

2. The telemetry system of claim 1, wherein the local communication means includes a local transceiver which collects the signals from each mobile monitoring sub-system and transmits the signals to the receiving station via the at least one communications network.

3. The telemetry system of claim 2, wherein the system measures one or more parameters within one of a plurality of transport containers located in close proximity to one another during transit, and wherein each of the plurality of transport containers includes one of the mobile monitoring sub-systems, each of the mobile monitoring sub-systems being capable of receiving information transmitted from others of the mobile monitoring sub-systems, and one of the mobile monitoring sub-systems is a master mobile monitoring sub-system for receiving signals from others of the mobile monitoring sub-systems, whereby the master mobile monitoring sub-system receives the information signals from said other ones of the mobile monitoring sub-systems and transmits them to the local transceiver.

4. The telemetry system of claim 2, wherein the at least one communications network is a land based communications network and the local transceiver is a relay transceiver connected to the land based network.

5. The telemetry system of claim 2, wherein the at least one communications network includes a satellite and the local transceiver is a relay transceiver, arranged only to transmit on an interrogation from the satellite.

6. The system as claimed in claim 2, wherein the at least one communications network includes a satellite and the local transceiver is a relay transceiver arranged to initiate communication with a transponder mounted on the satellite.

7. The system as claimed in claim 2, wherein the local communication means comprises a low power transmitter in each monitoring sub-system which communicates with the local transceiver.

8. The system as claimed in claim 2, wherein the transport container is a shipping container of the type used for sea transportation.

9. The system as claimed in claim 2, wherein a plurality of transport containers are fitted with monitoring sub-systems and each transmits information, as required, to others of the transport containers similarly fitted with monitoring sub-systems, one of the transport containers is fitted with a master monitoring sub-systems for receiving signals from the monitoring sub-systems of other transport containers and the master monitoring sub-system collects all of the information signals from all of the other monitoring sub-systems the information signals and transmits to the transceiver which then transmits the information signals to the communications network.

10. The system as claimed in claim 2, wherein at least some of the monitoring sub-systems located in the transport containers are interconnected to one another or to the master monitoring sub-system by wire connections.

11. The system as claimed in claim 2, wherein at least some of the monitoring sub-systems located in the transport containers are in communication with each other and the master monitoring sub-systems via wireless communication means.

12. The system as claimed in claim 2, wherein monitoring functions of the mobile monitoring sub-systems include an input for monitoring one or more of, temperature, humidity, air flow, air pressure, percentage atmospheric content of oxygen, or ethylene in air in the transport container, the location, shock, power supply parameters, filtration operation, illumination levels, security breaches, surveillance camera operation and motion detection.

13. The system of claim 12, wherein measured parameters are used to predict a projected state of a perishable cargo at the end of a journey, from a history of the conditions to which the cargo has been subjected up to the current point in the journey.

14. The system as claimed in claim 12, wherein the measurement of the one or more parameters by a stand alone data logging device, causes one or more parameter values to be measured, the data logging device including measurement means for measuring the parameter values, storage means to record the measured parameter values and control means to periodically cause the measurement to be made and recorded in the storage means.

15. The system as claimed in claim 14, wherein the parameters measured are temperature and humidity.

16. The system as claimed in claim 14, wherein the storage means is a digital memory.

17. The system as claimed in claim 14, wherein the storage means is a magnetic storage device.

18. The system as claimed in claim 14, wherein the storage means is a floppy disk drive.

19. The system as claimed in claim 14, wherein the control means includes an input/output means for receiving a trigger signal to trigger the down loading of data and in response to the trigger signal, and generating an output signal representing some or all of the data held in the storage means.

20. The system as claimed in claim 19, wherein the control means records the parameter values at regular intervals.

21. The system of claim 20, wherein the control means records the parameter values at intervals in the range of once every 10 minutes to 2 hours.

22. The system as claimed in claim 14, wherein the control means comprises a control unit connected to the data logging device and to the local communication means and controls transmission via the at least one transceiver.

23. The system of claim 22, wherein the control unit periodically initiates downloading of the data from the data logging device and initiates a transmission automatically.

24. The system of claim 22, wherein the control unit responds to a signal transmitted to the communication means via the transceiver to initiate unloading of the data from the data logging device and transmission of the data to the receiving station.

25. The system as claimed in claim 1 wherein the local communication means is a transmitter arranged to transmit to a local transceiver which in turn relays the signal to the receiving station via pre-existing communications channels.

26. The system as claimed in claim 25, wherein the pre-existing communications system includes a communications channel associated with a satellite navigation system.

27. The system as claimed in claim 25, wherein the pre-existing communications system includes a communications channel of a satellite telephone system.

28. The system of claim 25, wherein the pre-existing communications system is a switched telephone network.

29. A remote sensing unit for a telemetry system, the remote sensing unit comprising:

parameter measurement means to measure a parameter or parameters of interest;

control means which holds data tolerance information for the or each parameter and when parameter data is provided by the parameter measurement means, the control means examines the parameter data and if it is within tolerance by comparison with the data tolerance information, indicates that the system is operating correctly and all data is in tolerance;

signal generating means to generate a signal indicating the status of the parameter data, the signal comprising:
  i) if the parameter data is in tolerance, a status code indicating the in tolerance status of the parameters; and
  ii) if the parameter data is out of tolerance, the parameter data; and communication means for transmitting the signal to a relay transceiver, located in close proximity to the communication means, the relay transceiver being in communication with a communication network for further transmission via the communication network.

30. The sensing unit as claimed in claim 29, wherein communication means is a low power transmitter which communicates with the relay transceiver.

31. The sensing unit as claimed in claim 29, wherein monitoring functions of the remote sensing unit include, an input for monitoring one or more of, temperature, humidity, air flow, air pressure, percentage atmospheric content of oxygen, or ethylene in air, location, shock, power supply parameters, filtration operation, illumination levels, security breaches, surveillance camera operation and motion detection.

32. The sensing unit as claimed in claim 29, wherein the measurement of the one or more parameters by a stand alone data logging device causes one or more parameter values to be measured, the data logging device including measurement means for measuring the parameter values, storage means to record the measured parameter values and wherein the control means periodically causes the measurement to be made and recorded in the storage means.

33. The sensing unit as claimed in claim 32, wherein the parameter measures are temperature and humidity.

34. The sensing unit as claimed in claim 32, wherein the storage means is a digital memory.

35. The sensing unit as claimed in claim 32, wherein the storage means is a magnetic storage device.

36. The sensing unit as claimed in claim 32, wherein the storage means is a floppy disk drive.

37. The sensing unit as claimed in claim 32, wherein the control means comprises a control unit connected to the data logging device and to the communication means and controls transmission via the at least one transceiver.

38. The sensing unit of claim 37, wherein the control unit periodically initiates downloading of the data from the data logging device and initiates a transmission automatically.

39. The sensing unit of claim 38, wherein the control unit responds to a signal transmitted to the communication means via the transceiver to initiate unloading of the data from the data logging device and transmission of the data to the receiving station.

40. The sensing unit as claimed in claim 29, wherein the control means includes an input/output means for receiving a trigger signal to trigger the down loading of data and in response to the trigger signal, and generating an output signal representing some or all of the data held in the storage means.

41. The sensing unit as claimed in claim 40, wherein the control means records the parameter values at regular intervals.

42. The sensing unit of claim 41, wherein the control means records the parameter values at intervals in the range of once every 10 minutes to 2 hours.

43. A control unit arranged to be connectable to a data logging device, the control unit comprising:
   trigger signal generating means to trigger the data logging device to unload data;
   data input means to receive data from the connected data logging device;
   a data storage means to hold data tolerance information whereby when the data is unloaded from the data logging device, the control unit examines the unloaded data and determines if it is in tolerance when compared with the data tolerance information;
   signal generating means to generate a signal indicating the status of the unloaded data, the signal comprising:
      i) if the data is in tolerance, a status code indicating the in tolerance status of the data; and
      ii) if the data is out of tolerance, the unloaded data encoded in a format suitable for transmission over a communications network; and
   input/output means arranged for connection to a communications device for communicating the signal generated by the signal generating means to the communication device.

44. The control unit as claimed in claim 43, wherein monitoring functions of the data logging device include, an input for monitoring one or more of, temperature, humidity, air flow, air pressure, percentage atmospheric content of oxygen, or ethylene in air, a current location, shock, power supply parameters, filtration operation, illumination levels, security breaches, surveillance camera operation and motion detection.

45. The control unit of claim 43, wherein the monitoring functions of the data logging device include an input for measuring power supply conditions of environmental control equipment supporting or forming part of a consignment, shaft speed of the vessel, water purity in a bilge, pollution levels, status of pollution control equipment, machinery discharge, sewage outflows, discharge of ships' ballast, noise, air quality, water quality, vessel position (eg; GPS), surveillance cameras, locking and unlocking of controlled spaces, and entry and exit of controlled spaces.

46. The control unit as claimed in claim 43, wherein the measurement of the one or more parameters by the data logging device, includes measurement means for measuring one or more parameter values, and storage means to record the measured parameter values, the data logging device being responsive to the control unit to periodically cause the measurement to be made and recorded in the storage means.

47. The control unit as claimed in claim 46, wherein the parameters measured are temperature and humidity.

48. The control unit as claimed in claim 46, wherein the storage means is a digital memory.

49. The control unit as claimed in claim 46, wherein the storage means is a magnetic storage device.

50. The control unit as claimed in claim 46, wherein the storage means is a floppy disk drive.

51. The control unit as claimed in claim 43, further comprising an input/output means for receiving a trigger signal to trigger the down loading of data and generating an output signal representing some or all of the data held in the storage means in response to the trigger signal.

52. The control unit as claimed in claim 51, wherein the control unit causes the data logging device to record the parameter values at regular intervals.

53. The control unit of claim 52, wherein the data logging device records the parameter values at intervals in the range of once every 10 minutes to 2 hours.

54. The control unit as claimed in claim 43, comprising a communication control means connected to the data logging device and to the communications device which controls communication of the signal generated by the signal generating means to the communication device.

55. The control unit of claim 54, wherein the trigger signal generating means periodically initiates downloading of the data from the data logging device and the communication control means initiates a transmission over a communication network automatically.

56. A telemetry system for measuring one or more parameters within a transport vehicle or vessel and transmitting a signal indicating the value or values of the one or more measured parameters, or the status of the respective transport vehicle or vessel, over a significant distance via at least one communications network, the system comprising:
   a) a receiving station connected to the communications network;
   b) monitoring means for receiving the signal and indicating the value or any one of the values represented by the signal, or the transport vehicle or vessel status; and
   c) a mobile monitoring sub-system mounted on or within the transport vehicle or vessel comprising:
      i) parameter measurement means to measure the respective parameters;
      ii) signal generating means to generate a signal for transmission indicating the value or values of the one or more measured parameters, or a status of the transport vehicle or vessel, wherein the signal generating means holds data tolerance information in relation to the respective transport vehicle or vessel and, when the signal generated by the signal generating means is to be transmitted, the signal generating means examines the value or values of the one or more measured parameters and if they are in tolerance, generates a status signal indicating that the system is operating correctly and all parameters are in tolerance and if they are not in tolerance, the signal generating means generates the signal representing the value or values of the one or more measured parameters; and
      iii) local communication means for transmitting the signal via the at least one communications network to the receiving station and the monitoring means.

57. The telemetry system of claim 56, wherein the local communication means includes a local transceiver which collects the signals from each mobile monitoring sub-system and transmits the signals to the receiving station via the at least one communications network.

58. The telemetry system of claim 56, wherein the system measures one or more parameters within close proximity of one of a plurality of mobile monitoring sub-systems located around the transport vehicle or vessel, each of the mobile monitoring sub-systems being capable of receiving information transmitted from others of the mobile monitoring sub-systems, and one of the mobile monitoring sub-systems is a master mobile monitoring sub-system for receiving signals from others of the mobile monitoring sub-systems, whereby the master mobile monitoring sub-system receives the information signals from said other ones of the mobile monitoring sub-systems and transmits them to the local transceiver.

59. The telemetry system as claimed in claim 56, wherein the at least one communications network is a land based communications network and the local transceiver is a relay transceiver connected to the land based network.

60. The telemetry system as claimed in claim 56, wherein the at least one communications network includes a satellite and the local transceiver is a relay transceiver, arranged only to transmit on an interrogation from the satellite.

61. The system as claimed in claim 56, wherein the at least one communications network includes a satellite and the local transceiver is a relay transceiver arranged to initiate communication with a satellite mounted transponder.

62. The system as claimed in claim 56, wherein the local communication means comprises a low power transmitter in each monitoring sub-system which communicates with the local transceiver.

63. The system as claimed in claim 56, wherein the parameter measurement means and the signal generating means are located in a fixed location in the transport vehicle or vessel and the communications means is a low power transmitter which communicates with the transceivers.

64. The system of claim 63, wherein the parameter measurement means and the signal generating means are mounted in an equipment space of a ship.

65. The system of claim 64, wherein the parameter measurement means measures ballast water quality and status of ballast dumping valves.

66. The system of claim 63, wherein the monitoring functions of the mobile monitoring sub-systems include an input for measuring power supply conditions of environmental control equipment or equipment supporting or forming part of a consignment, shaft speed of the vessel, water purity in a bilge, filtration operation, illumination levels, pollution levels, security breaches, surveillance camera operation or motion detection, status of pollution control equipment, machinery discharge, sewage outflows, discharge of ships' ballast, noise, air quality, water quality, vessel position, surveillance cameras, locking and unlocking of controlled spaces, and entry and exit of controlled spaces.

67. A control unit arranged to be connectable to a data logging device, the control unit comprising:

trigger signal generating means to trigger the data logging device to unload data;

data input means to receive data from the connected data logging device;

a data storage means to hold data tolerance information whereby when the data is unloaded from the data logging device, the control unit examines the unloaded data and determines if it is in tolerance when compared with the data tolerance information;

signal generating means to generate a signal indicating the status of the unloaded data, the signal comprising:
  i) if the data is in tolerance, a status code indicating the in tolerance status of the data; and
  ii) if the data is out of tolerance, the unloaded data encoded in a format suitable for transmission over a communications network; and input/output means arranged for connection to a communications device for communicating the signal generated by the signal generating means to the communication device, and wherein the monitoring functions of the data logging device include an input for measuring power supply conditions of environmental control equipment supporting or forming part of a consignment, shaft speed of the vessel, water purity in a bilge, pollution levels, status of pollution control equipment, machinery discharge, sewage outflows, discharge of ships' ballast, noise, air quality, water quality, vessel position, surveillance cameras, locking and unlocking of controlled spaces, and entry and exit of controlled spaces.

68. A telemetry system for measuring one or more parameters within a transport vehicle or vessel and transmitting a signal indicating the value or values of the one or more measured parameters, or the status of the respective transport vehicle or vessel, over a significant distance via at least one communications network, the system comprising:

a) a receiving station connected to the communications network;

b) monitoring means for receiving the signal and indicating the value or any one of the values represented by the signal, or the transport vehicle or vessel status; and c) a mobile monitoring sub-system mounted on or within the transport vehicle or vessel comprising:
  i) parameter measurement means to measure the respective parameters;
  ii) signal generating means to generate a signal for transmission indicating the value or values of the one or more measured parameters, or a status of the transport vehicle or vessel, wherein the signal generating means holds data tolerance information in relation to the respective transport vehicle or vessel and, when the signal generated by the signal generating means is to be transmitted, the signal generating means examines the value or values of the one or more measured parameters and if they are in tolerance, generates a status signal indicating that the system is operating correctly and all parameters are in tolerance and if they are not in tolerance, the signal generating means generates the signal representing the value or values of the one or more measured parameters; and
  iii) local communication means for transmitting the signal via the at least one communications network to the receiving station and the monitoring means, wherein the parameter measurement means and the signal generating means are located in a fixed location within an equipment space of a ship and the communications means is a low power transmitter which communicates with the transceivers and the parameter measurement means measures ballast water quality and status of ballast dumping valves.

69. A telemetry system for measuring one or more parameters within a transport vehicle or vessel and transmitting a signal indicating the value or values of the one or more measured parameters, or the status of the respective transport vehicle or vessel, over a significant distance via at least one communications network, the system comprising:

a) a receiving station connected to the communications network;

b) monitoring means for receiving the signal and indicating the value or any one of the values represented by the signal, or the transport vehicle or vessel status; and c) a mobile monitoring sub-system mounted on or within the transport vehicle or vessel comprising:
  i) parameter measurement means to measure the respective parameters;
  ii) signal generating means to generate a signal for transmission indicating the value or values of the one or more measured parameters, or a status of the transport vehicle or vessel, wherein the signal generating means holds data tolerance information in relation to the respective transport vehicle or vessel and, when the signal generated by the signal generating means is to be transmitted, the signal generating means examines the value or values of the one or more measured parameters and if they are in tolerance, generates a status signal indicating that the system is operating correctly and all parameters are in tolerance and if they are not in tolerance, the signal generating means generates the signal representing the value or values of the one or more measured parameters; and iii) local communication means for transmitting the signal via the at least one communications network to the receiving station and the monitoring means, wherein the parameter measurement means and the signal generating means are located in a fixed location in the transport vehicle or vessel and the communications means is a low power transmitter which communicates with the transceivers, and the monitoring functions of the mobile monitoring sub-system include an input for measuring power supply conditions of environmental control equipment or equipment supporting or forming part of a consignment, shaft speed of the vessel, water purity in a bilge, filtration operation, illumination levels, pollution levels, security breaches, surveillance camera operation or motion detection, status of pollution control equipment, machinery discharge, sewage outflows, discharge of ships' ballast, noise, air quality, water quality, vessel position, surveillance cameras, locking and unlocking of controlled spaces, and entry and exit of controlled spaces.

* * * * *